United States Patent [19]

Neal

[11] 4,345,767
[45] Aug. 24, 1982

[54] FLUID SEAL ELEMENT FOR COMPRESSED AIR FILTER

[75] Inventor: Brian P. Neal, Kingswood, England

[73] Assignee: Bendix Westinghouse Ltd., Bristol, England

[21] Appl. No.: 164,111

[22] Filed: Jun. 30, 1980

[30] Foreign Application Priority Data

Aug. 2, 1979 [GB] United Kingdom ................ 7926885

[51] Int. Cl.³ .................... F16T 1/14; B01D 27/10; F16J 15/00
[52] U.S. Cl. ........................................ 277/12; 277/28; 277/166; 137/179; 137/182; 137/859; 210/130
[58] Field of Search ............... 137/179, 182, 852, 853, 137/855, 859, 854, 512.15; 277/28, 29, 12, 166; 210/130–133

[56] References Cited

U.S. PATENT DOCUMENTS

| | | | |
|---|---|---|---|
| 1,031,653 | 7/1912 | Leuthesser | 137/182 X |
| 2,173,307 | 9/1939 | McKinnon | 137/103 |
| 2,897,835 | 8/1959 | Philippe | 137/218 |
| 3,567,023 | 3/1971 | Buckman et al. | 210/130 |
| 3,580,273 | 5/1971 | Schwarz | 137/218 X |
| 3,957,640 | 5/1976 | Stack | 210/117 |
| 3,984,318 | 10/1976 | Bumb | 210/130 |

FOREIGN PATENT DOCUMENTS

| | | |
|---|---|---|
| 1272756 | 5/1972 | United Kingdom . |
| 1275651 | 5/1972 | United Kingdom . |
| 1390003 | 4/1975 | United Kingdom . |
| 1418394 | 12/1975 | United Kingdom . |

Primary Examiner—Robert S. Ward, Jr.
Attorney, Agent, or Firm—Ken C. Decker; W. N. Antonis

[57] ABSTRACT

An annular fluid seal element for use in an air drier or condenser has a section which provides lips which, when assembled to an aperture in a member, lie to either side of the aperture, one shorter lip acting as a compression seal between the latter member and another and the other longer lip sealingly covering a plurality of passages on the member but permitting fluid flow via the passages in the event of pressure build-up inside them.

1 Claim, 1 Drawing Figure

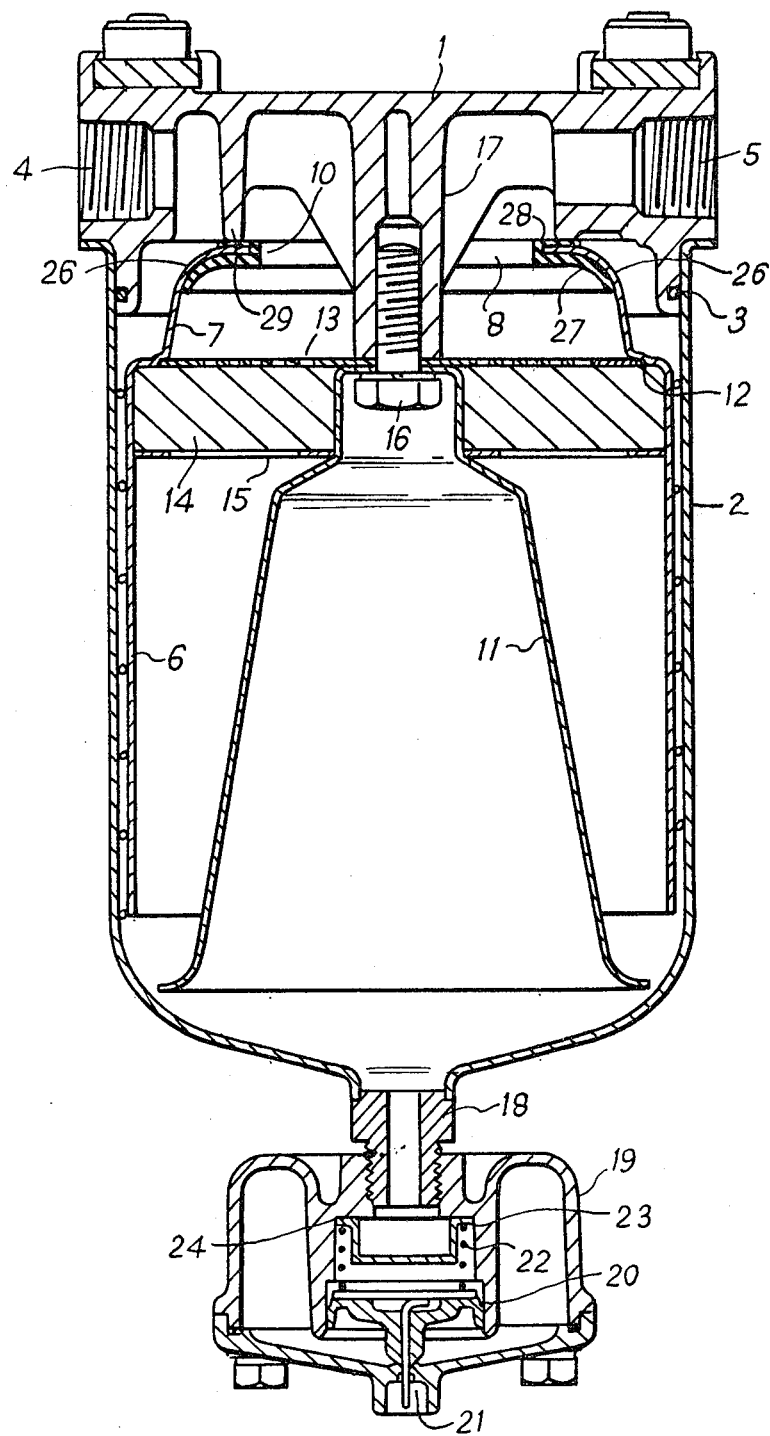

FLUID SEAL ELEMENT FOR COMPRESSED AIR FILTER

This invention relates to fluid seal elements and relates particularly to seal elements which permit a by-passing fluid flow upon build-up of pressure differential, especially but not exclusively for use in filter or condenser units for pressurised air systems.

It has been proposed to provide condensers in pressurised air systems for removing moisture from a pressurised air supply. Such condensers often include a strainer or filter element and there is a risk that such an element may become blocked in adverse operating conditions such as experienced in the case of pressurised air braking systems for heavy road vehicles. It has also been proposed in filters to introduce means which can act as a bypass path to enable fluid flow to continue even in the event of a blockage of a filter element.

According to the present invention there is provided a fluid seal element comprising a moulding of resiliently deformable material having a generally "U"-shaped section to provide two lips which permit mounting thereof on a first member for the purpose of acting as a seal between such a member and another when in engagement therewith and one lip of the generally "U"-shaped section being shaped to sealingly cover one side of an aperture but to permit fluid flow from the other side to the one side of the aperture upon build-up of fluid pressure across it.

In a specific embodiment of the invention, said seal element is arranged as a seal between a fluid pressure input port and a fluid pressure output port of a filter or condenser housing, said element being annular and such as to wrap around the inner edge of an aperture of a cage member, the one lip resiliently acting on the output port side of the cage member to close a plurality of apertures therein and the other lip acting to provide sealing between the cage member and said housing.

In order that the invention may be more clearly understood, the same will be further described by way of example with reference to the accompanying drawing which illustrates a condenser unit for use in a pressurised air braking system for a heavy vehicle.

The condenser comprises a main housing made up of an upper casting denoted by reference 1 and a lower pressed steel member denoted by reference 2 which is bolted to the casting 1 and is sealed therewith by means of an O-ring 3. The casting 1 has a pressurised air input port 4 and a pressurised air output port 5 and bolted within the unit there is provided an inner cage 6 with an upper dished section 7 with an aperture 8 around the periphery of which there is retained a hard rubber moulded seal generally "V"-shaped with a short lip 28 and a longer curved lip 27 spaced to fit the inner edge of the aperture 8 in part 7. Clamped between an inner bell-shaped member 11 and a shoulder 12 of the cage 6, there is retained a condenser/filter element 14, itself being supported by an upper perforated disc 13 and a lower perforated disc 15, the whole being retained by an inner bolt 16 screwed into a central boss 17 of the upper casting 1.

Mounted on a boss 18 welded into the lower extremity of the housing 2, there is provided an automatic drain valve which operates in generally known manner to discharge condensed moisture from the lower extremity of the housing in response to pressure fluctuations therein. Briefly, the drain valve 19 consists of a lower piston/valve element 20 which in the position shown seals a lower outlet aperture 21 under the influence of a spring 22 which urges a further member 23 against a shoulder 24.

Reverting to the dished shape part 7 of the inner cage, this is provided with a number of apertures such as 26, which are normally closed by the curved lip 27 of the hard rubber seal 10. However, the seal 10 is sufficiently resilient to permit flow of pressurised air between the port 4 and the port 5 in the event of a sufficiently great pressure differential being built up across the seal 10. The lip 28 sealingly engages with an annular seat 29 of the casting 1 as shown.

Referring now to the general manner of operation of the condenser unit, air under pressure is supplied via the port 4 and passes down between the cylindrical wall of the body portion 2 and the wall of the inner cage 6, depositing a certain amount of moisture between these walls which run down to the lower part of the housing 2, the partially dried air is thus able to pass up through the filter element 14 to the port 5 for supply to one or more reservoirs of the pressurised air system. When the compressor comes on load, there is a pressure rise in the region beneath the filter 14 and condensed moisture is driven past the piston 20 of the drain valve into the region beneath it. At the same time, the pressure beneath the piston 20 builds up to a pressure which is substantially the same as that in the condenser unit. On subsequent reduction of pressure in the condenser unit when the compressor comes off load, the pressure beneath the piston 20 causes the piston 20 to be deflected upwardly to permit the ejection of moisture through the lower aperture 21.

In the event of the pressure differential across the filter 14 being greater than a prescribed amount which is indicative of at least partial blockage of the filter element 14, the lower curved lip 27 of the seal 10 is deflected by the pressure acting through apertures 26 to provide a bypass flow path for pressurised air.

Having thus described our invention what we claim is:

1. A fluid pressure unit comprising a housing having an input port and an outlet port, an internal member for carrying a filter element, said internal member having a generally bell-shaped section with an axial aperture, an annular seal element for said aperture comprising a generally "U"-shaped section to provide two lips, one disposed outside the bell-shape and one inside the bell section, one lip longer than the other, the bell-shape having at least one further aperture covered by the longer said lip and means mounting said internal member whereby connection between the inside and outside via said aperture is closed by a seal effected by the shorter said lip, the longer said lip being deflectable to provide a bypass via the further aperture in the event of a pressure build-up on one side thereof.

* * * * *